United States Patent
Blea et al.

(10) Patent No.: US 7,376,676 B2
(45) Date of Patent: May 20, 2008

(54) METHOD, SYSTEM, AND PROGRAM FOR AUTONOMIC COPY SERVICES SOLUTIONS

(75) Inventors: David Randall Blea, Tucson, AZ (US); Errol Jay Calder, Vail, AZ (US); Todd Benjamin Schlomer, Tucson, AZ (US); Jimmie Lee Brundidge, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 10/621,806

(22) Filed: Jul. 17, 2003

(65) Prior Publication Data

US 2005/0015414 A1    Jan. 20, 2005

(51) Int. Cl.
*G06F 12/00* (2006.01)
(52) U.S. Cl. ...................... 707/203; 711/162
(58) Field of Classification Search ........ 707/200–203; 711/120, 162
See application file for complete search history.

(56) References Cited

U.S. PATENT DOCUMENTS

| | | | |
|---|---|---|---|
| 5,410,667 A | 4/1995 | Belsan et al. | |
| 6,226,792 B1 * | 5/2001 | Goiffon et al. | 717/120 |
| 6,427,230 B1 | 7/2002 | Goiffon et al. | |
| 6,611,901 B1 * | 8/2003 | Micka et al. | 711/162 |
| 6,738,152 B1 * | 5/2004 | Roth et al. | 358/1.14 |
| 6,799,258 B1 * | 9/2004 | Linde | 711/162 |
| 6,848,021 B2 * | 1/2005 | Segev et al. | 711/113 |
| 7,191,299 B1 * | 3/2007 | Kekre et al. | 711/162 |
| 2002/0178252 A1 | 11/2002 | Balabhadrapatruni et al. | |
| 2003/0028723 A1 | 2/2003 | Segev et al. | |

OTHER PUBLICATIONS

"Symmetrix Data Mobility Manager", $EMC^2$, 2003 [online], [retrieved on Jul. 17, 2003]. Retrieved from the Internet <URL:http://www.emc.com/products/storage_management/sdmm.jsp.

* cited by examiner

*Primary Examiner*—Wilson Lee
(74) *Attorney, Agent, or Firm*—Janaki K. Davda; Konrad Raynes & Victor LLP

(57) ABSTRACT

Disclosed is a technique for creating a copy services solution. A document describing the copy services solution is received. The document is converted to executable code. The code is executed to perform one or more base copy services solutions described with base copy types in the document.

17 Claims, 8 Drawing Sheets

METHOD, SYSTEM, AND PROGRAM FOR AUTONOMIC COPY SERVICES SOLUTIONS

BACKGROUND OF THE INVENTION

1. Field of the Invention

The present invention is related to autonomic copy services solutions.

2. Description of the Related Art

Disaster recovery systems typically address two types of failures, a sudden catastrophic failure at a single point in time or data loss over a period of time. In the second type of gradual disaster, updates to volumes may be lost. A volume is any logical or physical element of storage. To assist in recovery of data updates, a copy of data may be provided at a remote location. Such dual or shadow copies are typically made as the application system is writing new data to a primary storage device. A storage device is a physical unit that provides a mechanism to store data on a given medium, such that the data can be subsequently retrieved.

International Business Machines Corporation (IBM), the assignee of the subject patent application, provides systems for maintaining remote copies of data at a secondary storage device, including peer-to-peer remote copy (PPRC). The PPRC system provides techniques for recovering data updates between a last, safe backup and a system failure. Such data shadowing systems can also provide an additional remote copy for non-recovery purposes, such as local access at a remote site.

Moreover, a number of direct access storage device (DASD) subsystems are capable of performing "instant virtual copy" operations, also referred to as "fast replicate functions." Instant virtual copy operations work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

Instant virtual copy has been an important development in modern disk subsystems, and a number of different techniques have surfaced. As one example, International Business Machines Corporation (IBM) has developed the Flash-Copy® copy services solution, as described in different publications including U.S. application Ser. No. 09/347,344, filed on Jul. 2, 1999 and entitled "Method, System, and Program for Maintaining Electronic Data as of a Point-In-Time." A different fast replicate technique is the "SNAP-SHOT" copy services solution disclosed in U.S. Pat. No. 5,410,667 entitled "Data Record Copy System for a Disk Drive Array Data Storage Subsystem," which issued on Apr. 25, 1995. The foregoing references are incorporated herein by reference in their entirety.

Instant virtual copy techniques have been developed, at least in part, to quickly create a duplicate copy of data without interrupting or slowing foreground processes. Instant virtual copy techniques, such as a FlashCopy® copy services solution, provide a point-in-time copy tool. Instant virtual copy techniques may be used for a variety of applications, including, for example, data backup, data migration, data mining, testing, etc.

For example, an instant virtual copy technique may be used for the creation of a physical "backup" copy of the source data, to aid in disaster recovery. Under one such technique, a copy services solution, such as a FlashCopy® or "SNAPSHOT" copy services solution, is used to perform an instant virtual copy operation; this creates a virtual target volume identical to the source volume in all respects. Then, the virtual target volume is taken off-line (i.e., is not accessible), which may occur automatically as a result of the instant virtual copy operation or manually at the direction of a system administrator.

There are many different copy services solutions across different vendors, some being similar to each other and some being very different. Many of the copy services solutions, however, are made up of a set of base copy services solutions strung together to create a new copy services solution. FIG. 1 illustrates a prior art copy services solution. This solution performs a FlashCopy® copy services solution from volume A 100 to volume B 102, a Peer to Peer Remote Copy (PPRC) copy services solution from volume B 102 to volume C 104, and a final FlashCopy® copy services solution from volume C 104 to volume D 106 to generate a remote point-in-time copy (i.e., a point-in-time copy at a remote site). Volumes A, B, C, and D may be located at a same physical site or at different physical sites. As another example, a remote point-in-time copy may be generated with a PPRC synchronous copy to a local site, and then a PPRC asynchronous copy to a remote site.

Because different customers have different needs, different copy services solutions are formed to address the needs. However, it is difficult to keep up with the growing number of copy services solutions. Many of these copy services solutions, given hardware alone, require manual intervention, which is inefficient and leads to human error. Also, current copy services solutions involve writing complex management code for specific copy types that run complex scripts, which are difficult to set up. This is a very time consuming and error prone task for a storage administrator.

Therefore, there is a need in the art for improved copy services solutions.

SUMMARY OF THE INVENTION

Provided are a method, system, and program for creating a copy services solution. A document describing the copy services solution is received. The document is converted to executable code. The code is executed to perform one or more base copy services solutions described with base copy types in the document.

The described implementations of the invention provide a method, system, and program for dynamically building new copy services solutions based on base copy services solutions. Thus, implementations of the invention allow customers to customize their copy services solutions to their environment. Moreover, the new copy services solutions may be event driven, and implementations of the invention add control to the copy services solutions by predefining actions to be taken in light of those events. Also, automation is built into the new copy services solutions by allowing actions to be defined for certain events, thus, removing human intervention for the new copy services solutions.

BRIEF DESCRIPTION OF THE DRAWINGS

Referring now to the drawings in which like reference numbers represent corresponding parts throughout

DETAILED DESCRIPTION

In the following description, reference is made to the accompanying drawings which form a part hereof and which illustrate several implementations of the present invention. It is understood that other implementations may be utilized and structural and operational changes maybe made without departing from the scope of the present invention.

Figure 1:
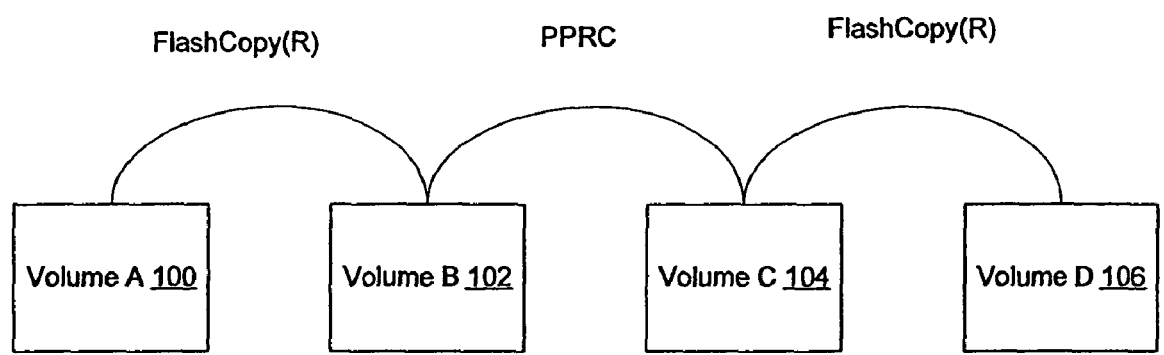
FIG. 1 illustrates a prior art copy services solutions.
Figure 2:
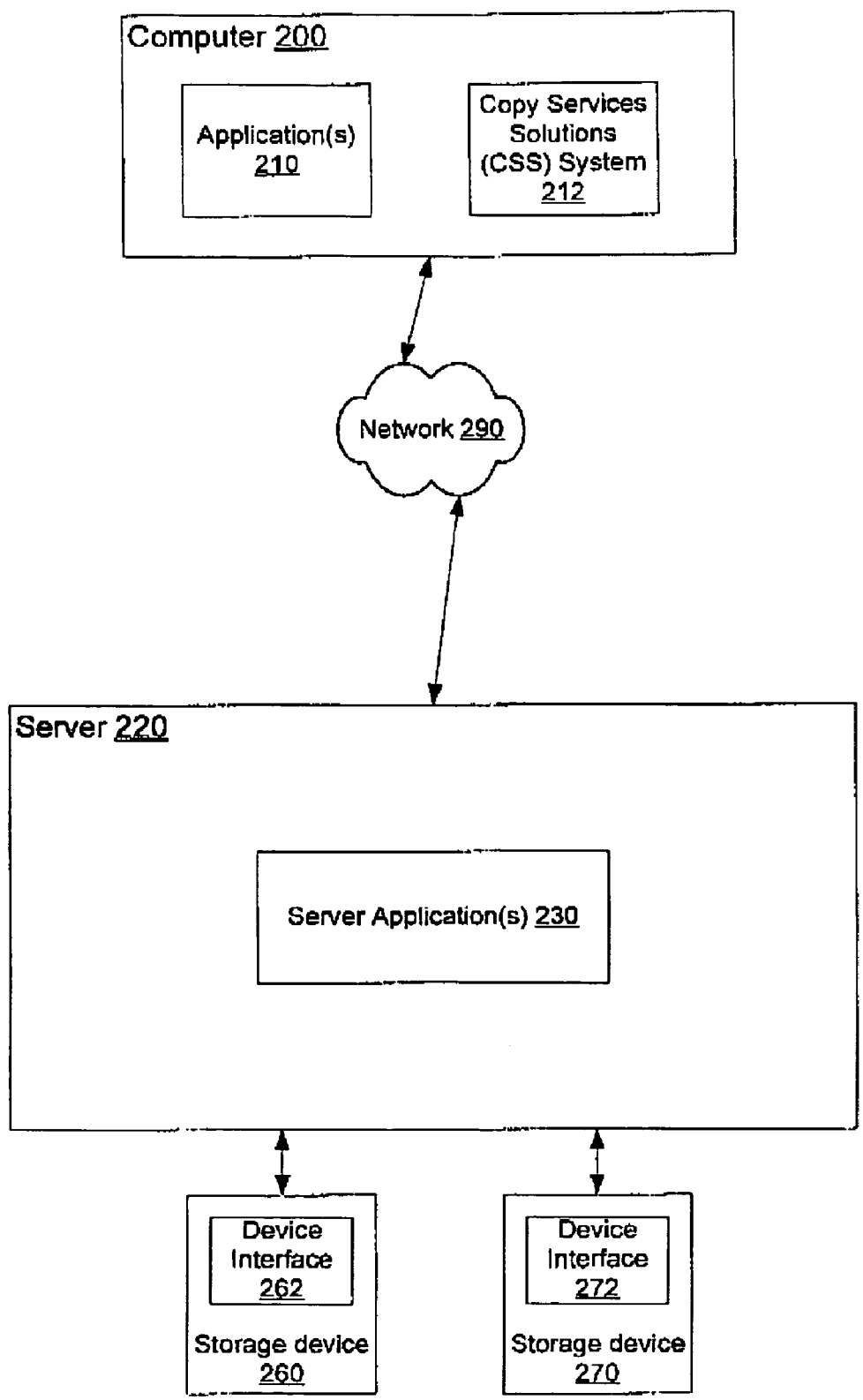
FIG. 2 illustrates, in a block diagram, a computing environment in accordance with certain implementations of the invention.

FIG. 2 illustrates, in a block diagram, a computing environment in accordance with certain implementations of the invention. A computer 200 executes one or more applications 210. An application 210 may be any type of application program. The computer 200 may be a client computer, a server computer, an operator console, or any other computer. The computer 200 also executes a copy services solution (CSS) system 212, which executes one or more copy services solutions. The computer 200 is connected to a server computer 220 by a network 290, such as a local area network (LAN), wide area network (WAN), or the Internet. The Internet is a world-wide collection of connected computer networks (i.e., a network of networks).

The applications 210 may access data managed by the server 220. The server 220 includes one or more server applications 230. An application 230 may be any type of application program.

Moreover, the server 220 is connected to storage devices 260, 270, and each storage device 260, 270 has a device interface 262, 272. For example, each storage device 260 and 270 may be a redundant array of independent disks (RAID). A RAID device enables storage of the same data on multiple hard disks, thus allowing simultaneous accesses to copies of the data.

Many base copy services solutions fall into one of two base copy types: continuous or point-in-time. For ease of understanding, these two base copy types will be referred to in examples herein, but implementations of the invention are applicable to any base copy type known in the art. A continuous base copy type refers to a copy services solution in which copying is constantly performed (e.g., as soon as data is written to a first volume, the data is copied to a second volume). A point-in-time base copy type refers to a copy services solution in which a copy of data is made at a given point in time (e.g., a "picture" of data is made periodically, at some defined interval, such as every three hours or every midnight). Examples of continuous base copy services solutions include: PPRC (available from International Business Machines Corporation) and Symmetrix Remote Data Facility (SRDF™) (available from EMC Corporation). Examples of point-in-time base copy services solutions include: FlashCopy® (available from International Business Machines Corporation) and TimeFinder™ (available from EMC Corporation). PPRC and FlashCopy® copy services solutions may be implemented, for example, on an Enterprise Storage Server (ESS), available from International Business Machines Corporation. SRDF™ and TimeFinder™ copy services solutions may be implemented on a Symmetrix Data Mobility Manager (SDMM) product, available from EMC Corporation.

Implementations of the invention dynamically build a session for a chain of base copy types. In certain implementations of the invention, the term dynamically building a session indicates that the behavior of the session is defined by actions and events. A session may be started, for example, by an application program or by a command (e.g., an action), such as an action in response to an event. The term "session" for copy services solutions refers to the code that manages multiple sets of copies. For multiple copy services solutions that are being managed by a session, the same base copy type is applied to the first pair of volumes in each of the copy services solutions, to the second pair of volumes in each of the copy services solutions, etc.

Figure 3:
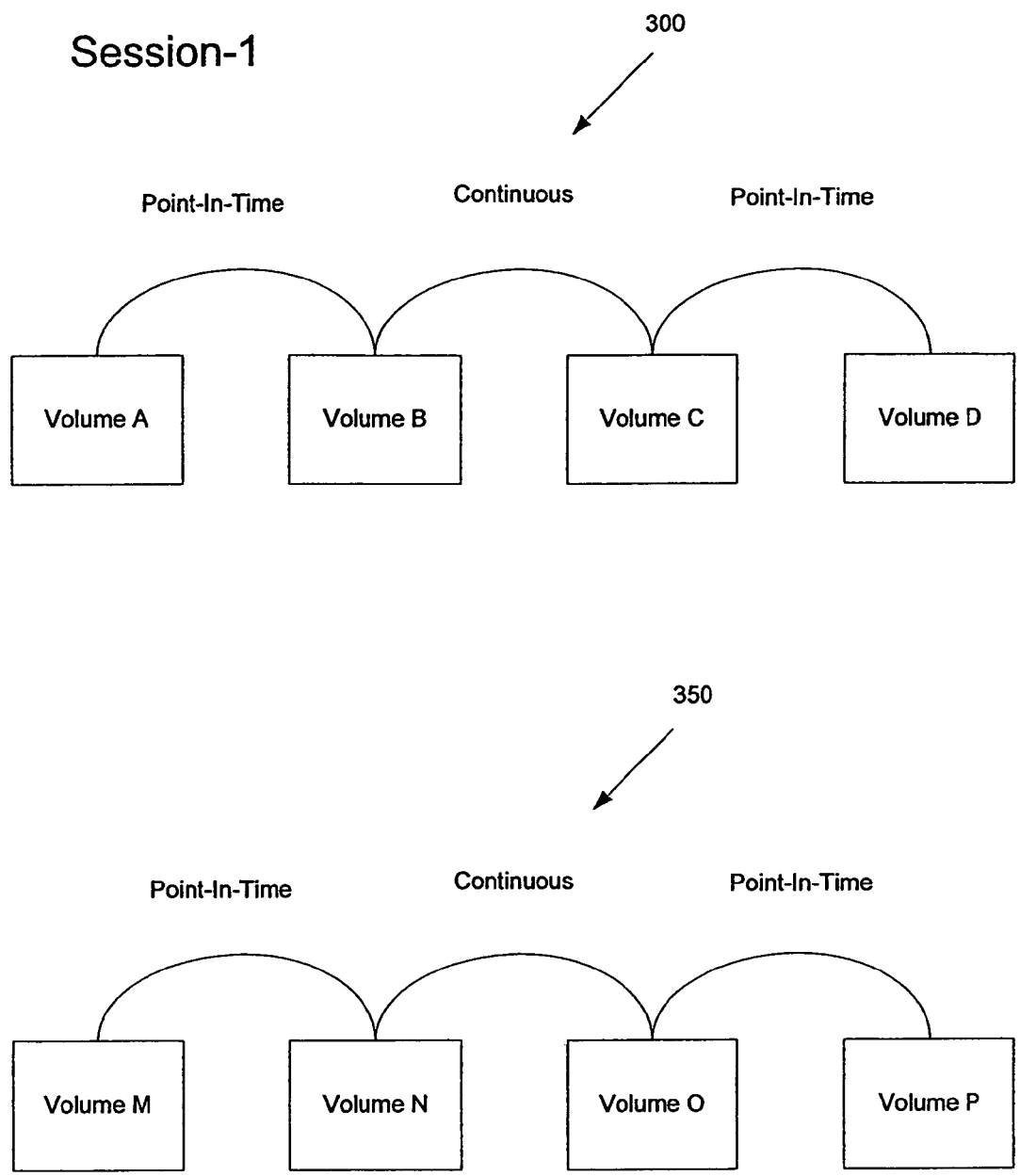
FIG. 3 illustrates a session that manages two copy services solutions in accordance with certain implementations of the invention.

FIG. 3 illustrates a session, labeled Session-1, which manages two copy services solutions 300 and 350 in accordance with certain implementations of the invention. Each copy services solution 300 and 350 performs a point-in-time copy between the first pair of volumes (e.g., Volumes A and B and Volumes M and N), a continuous copy between the second pair of volumes (e.g., Volumes B and C and Volumes N and O), and then a point-in-time copy between the third pair of volumes (e.g., Volumes C and D and Volumes O and P). That is, in this example, each copy operation between the first two volumes (e.g., Volume A and Volume B for copy services solution 300 and Volume M and Volume N for copy services solution 350) uses the same base copy type (e.g., continuous or point-in-time). In certain implementations of the invention, copy services solutions are performed in parallel. In certain alternative implementations, the copy services solutions may be performed in series. Volumes in a session may be located at a same physical site or at different physical sites or in some combination of same and different physical sites. In the session, each base copy services solution performed between two volumes may be a continuous base copy type, a point-in-time base copy type, or other copy type.

Moreover, implementations of the invention are hardware-independent and may be used for any computer architecture. A session may hold volumes for different hardware (e.g., for both an Enterprise Storage Server and an EMC Symmetrix Data Mobility Manager (SDMM) product)), with each volume implementing the same concepts for base copy types (e.g., each volume recognizes the base copy types, such as continuous and point-in-time). For example, a new copy services solution may be formed by combining PPRC (a continuous base copy type) across an Enterprise Storage Server and SRDF™ (a point-in-time base copy type) across an EMC Symmetrix Data Mobility Manager (SDMM) product.

Implementations of the invention allow for base copy services solutions of the continuous base copy type and/or point-in-time base copy type to be dynamically strung together to form a chain by specifying the base copy types. Each base copy type specified in the chain is referred to as a sequence. For example, if a chain is formed with a point-in-time base copy type (e.g., a FlashCopy® base copy services solution), a continuous base copy type (e.g., a PPRC base copy services solution), and another point-in-time base copy type (e.g., a FlashCopy® base copy services solution), there are three sequences, one for each base copy type. Moreover, each of the base copy types may have different characteristics. For example, the base copy services solutions that are of the continuous base copy type may be either synchronous or asynchronous. These characteristics may be specified for each base copy type in the chain.

Figure 4A:
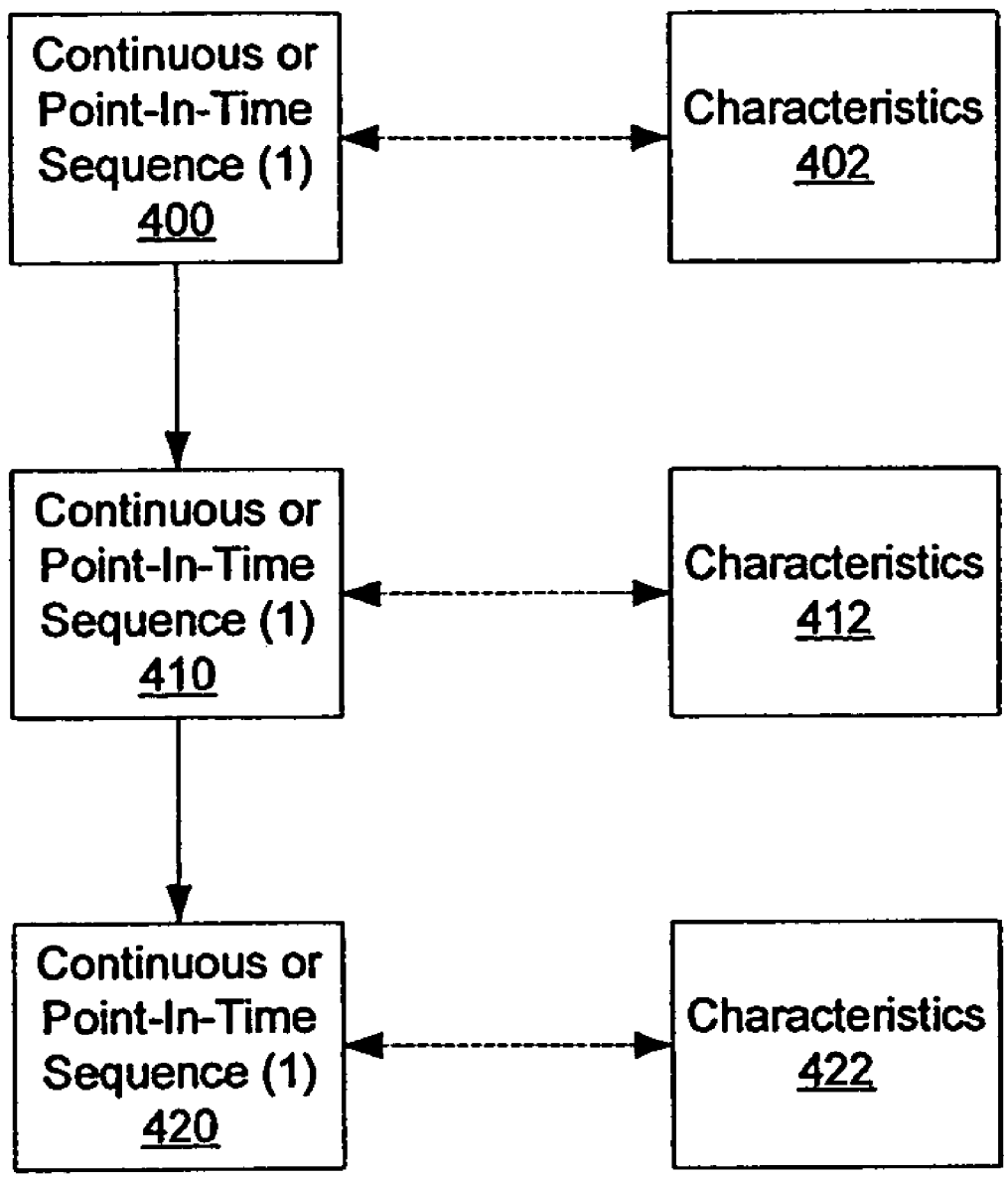
FIG. 4A illustrates a chain of base copy types in accordance with certain implementations of the invention.

FIG. 4A illustrates a chain of base copy types in accordance with certain implementations of the invention. The chain of base copy types includes a continuous or point-in-time sequence (1) 400, a continuous or point-in-time sequence (2) 410, and a continuous or point-in-time sequence (3) 420. The continuous or point-in-time sequence (1) 400 includes zero or more characteristics 402. The continuous or point-in-time sequence (2) 410 includes zero or more characteristics 412. The continuous or point-in-time sequence (3) 420 includes zero or more characteristics 422.

Certain implementations of the invention use Extensible Markup Language (XML) to define the sequences and their characteristics. In XML, elements are defined having a start tag, one or more attributes, and an end tag. XML may be used to define characteristics and may be sent across a network (e.g., a local area network (LAN), wide area network (WAN), the Internet, etc.) through a number of different protocols (e.g., Simple Object Access Protocol (SOAP), HyperText Transfer Protocol (HTTP), etc.). Implementations of the invention provide a set of elements and attributes that may be specified when creating an XML file to describe a session for a copy services solution. The elements and attributes may be used to define sequences, base copy types, properties of the base copy types that form each sequence, events that could occur and the actions to take if those events occur, and any actions a user may take on the session (e.g., "start").

The XML file contains a list of sequences, and each sequence has a set of zero or more associated characteristics. The XML file may be thought of as describing a copy services solution. Implementations of the invention deserialize the XML file into classes and uses those classes to form a session, and the session code itself may include a list of sequence handlers (i.e., code that issues commands to hardware to perform the base copy type described by the characteristics for that sequence in the XML file).

The following is sample pseudocode (1) that provides an example of XML for a copy services solution in which the first and last point-in-time base copy types do not include characteristics, but the continuous base copy type includes the characteristic "synchronous", which indicates that copying is to be synchronous.

```
<?xml version="1.0"?>
<SESSION>
    <SEQUENCE>
        <TYPE> Point-In-Time</TYPE>
    </SEQUENCE>
    <SEQUENCE>
```

-continued

```
        <TYPE> Continuous</TYPE>
        <CHARACTERISTIC> Synchronous </CHARACTERISTIC>
    </SEQUENCE>
    <SEQUENCE>
        <TYPE> Point-In-Time</TYPE>
    </SEQUENCE>
</SESSION>
```

Figure 5:
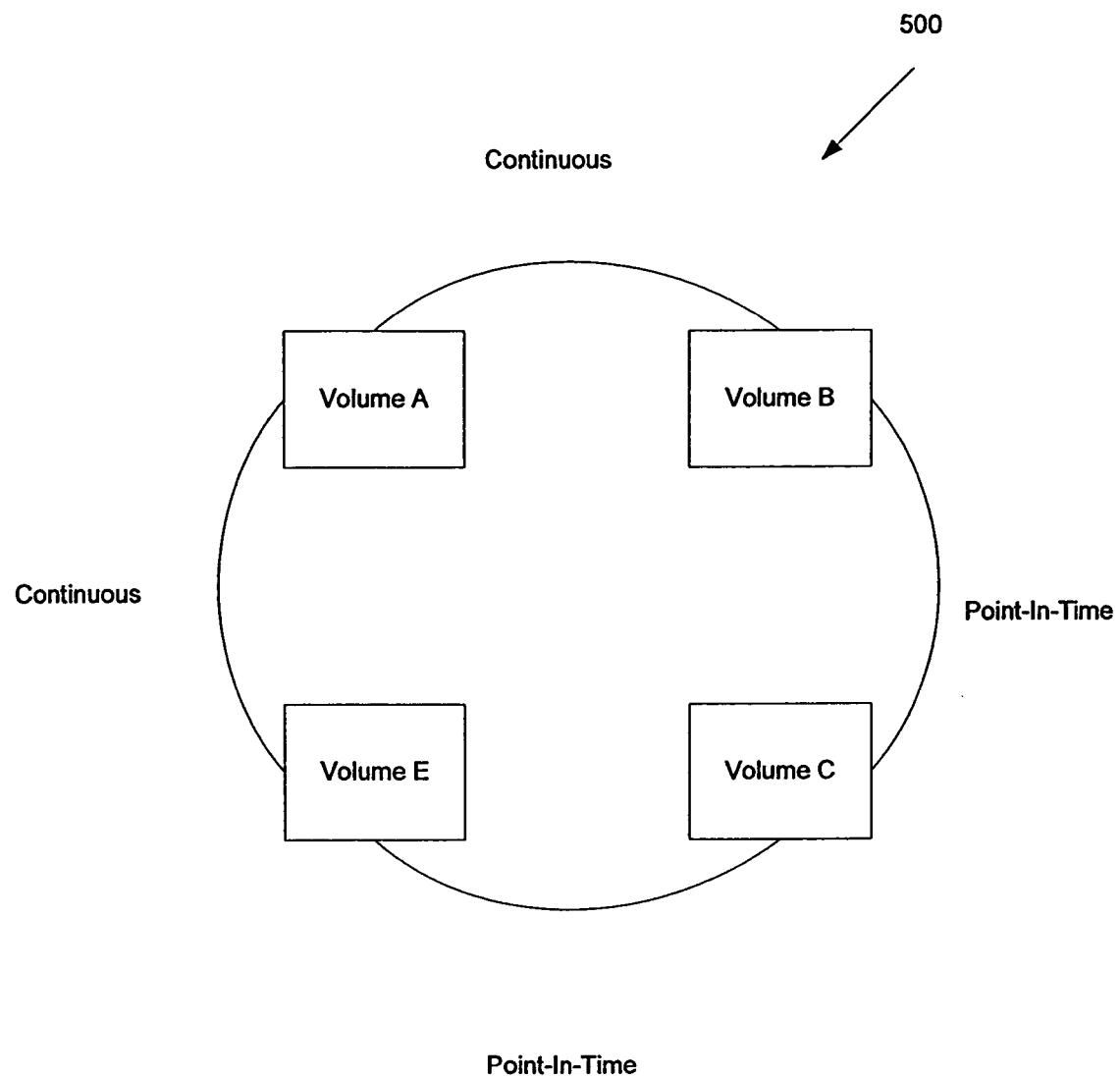
FIG. 5 illustrates a CPPC chain in accordance with certain implementations of the invention.

Implementations of the invention also add more automation to the session that is dynamically created. For example, one copy services solution may chain together a continuous base copy type, a point-in-time base copy time, another point-in-time base copy type, and a continuous base copy type. For ease of reference, this copy services solution will be referred to herein as a CPPC chain. FIG. 5 illustrates a CPPC chain 500 in accordance with certain implementations of the invention. The CPPC chain may be implemented with a PPRC, a FlashCopy®, another FlashCopy®, and a PPRC to create a continuous disaster recovery solution. The first PPRC may be a synchronous copy, which guarantees a copy of the data remotely. When an error occurs, a FlashCopy® may be performed so that there are two copies of the data at the time of the disaster, one that can be saved and another that can engage in another PPRC to start immediate backup again.

Implementations of the invention include in the XML file, tags for events whose contents describe the type of actions to take when that event occurs. In certain implementations of the invention, the actions are those that may be performed by an application program. Examples of events include occurrences of errors, all volumes entering a DUP status (i.e., a duplex status that indicates that the data on a first volume and a second volume are the same) in a continuous copy, etc. Actions that may be taken include starting the next sequence in the chain after an error (e.g., issuing a second point-in-time copy after the first point-in-time copy has an error in the CPPC chain), running an external script file that performs tasks related to a site switch (e.g., if a customer is executing applications at site A and copying data from site A to site B, a site switch may switch to running applications at site B, because, for example, site A is down due to a hardware and/or software error), etc.

Figure 4B:
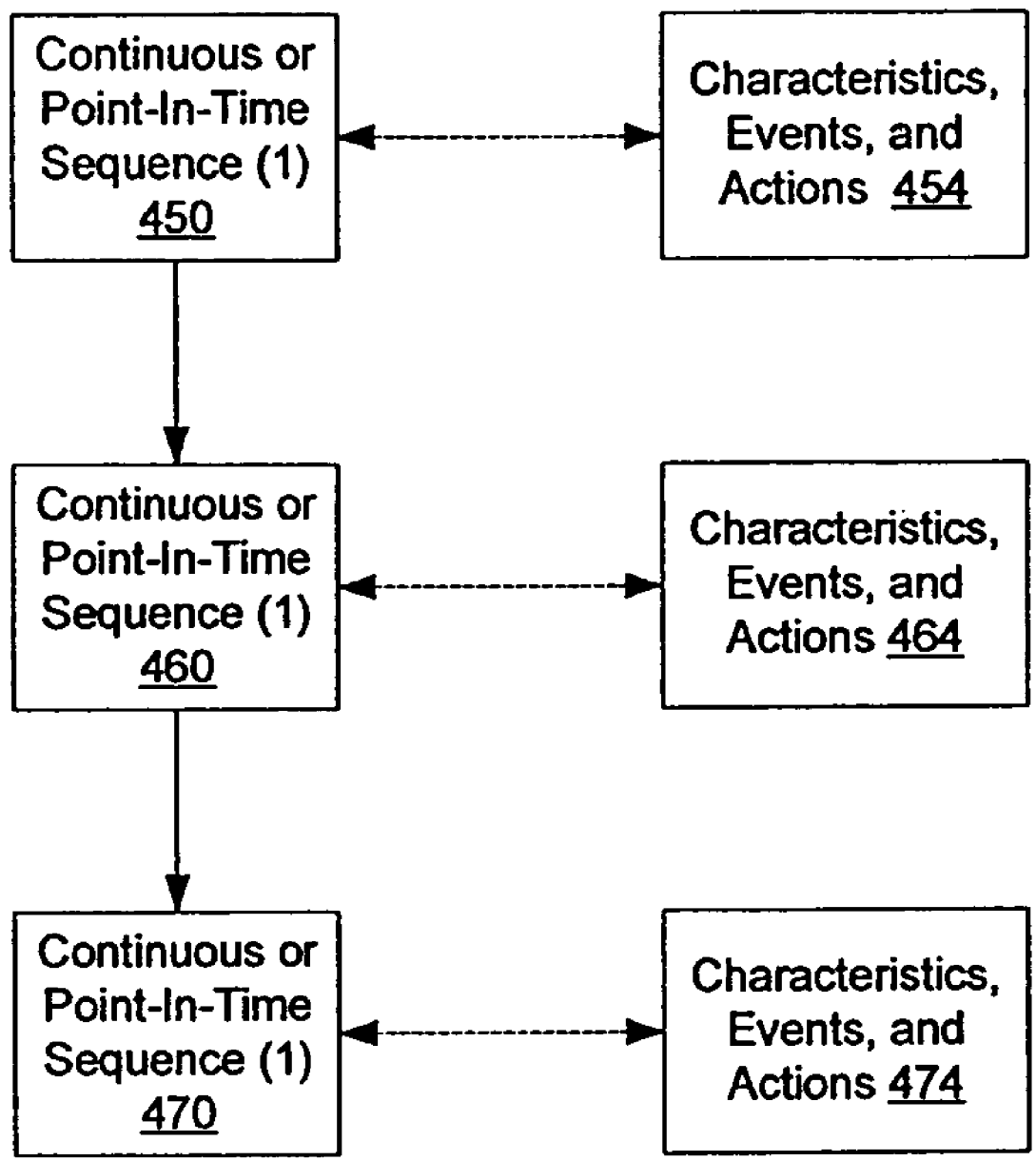
FIG. 4B illustrates a chain of base copy types in accordance with certain additional implementations of the invention.

FIG. 4B illustrates a chain of base copy types in accordance with certain additional implementations of the invention. The chain of base copy types includes a continuous or point-in-time sequence (1) 450, a continuous or point-in-time sequence (2) 460, and a continuous or point-in-time sequence (3) 470. The continuous or point-in-time sequence (1) 450 includes zero or more characteristics, events, and actions 454. The continuous or point-in-time sequence (2) 460 includes zero or more characteristics, events, and actions 464. The continuous or point-in-time sequence (3) 470 includes zero or more characteristics, events, and actions 474.

Thus, the XML file describes a list of sequences with characteristics and events and a list of actions to be performed when the defined events occur. This allows a user to chain together any combination of base copy types and to define actions that are to be performed when certain events take place during the execution of the base copy types.

The following is sample pseudocode that provides an example of XML for a CPPC chain that defines events and associated actions:

```
<?xml version="1.0"?>
<SESSION>
    <SEQUENCE>
        <TYPE> Continuous</TYPE>
        <SEQ_NUM> 1 </SEQ_NUM>
        <CMDFLAGS>
            <CMD> startFlags </CMD>
            <MODE> Synchronous </MODE>
        </CMDFLAGS>
        <EVENTFLAGS>
            <EVENT> onError </EVENT>
            <ACTION>
                <TO_SEQ> 1</TO_SEQ>
                <DO_CMD> Freeze </DO_CMD>
            </ACTION>
        </EVENTFLAGS>
    <SEQUENCE>
    <SEQUENCE>
        <TYPE> Point-In-Time </TYPE>
        <SEQ_NUM> 2 </SEQ_NUM>
        <CMDFLAGS>
            <CMD> startFlags </CMD>
            <MODE> Copy </MODE>
        </CMDFLAGS>
        <EVENTFLAGS>
            <EVENT> onComplete </EVENT>
            <ACTION>
                <TO_SEQ> 3</TO_SEQ>
                <DO_CMD> start </DO_CMD>
            </ACTION>
        </EVENTFLAGS>
        <EVENTFLAGS>
            <EVENT> onError </EVENT>
            <ACTION>
                <NOTIFY> Bill </NOTIFY>
            </ACTION>
        </EVENTFLAGS>
    <SEQUENCE>
    <SEQUENCE>
        <TYPE> Continuous</TYPE>
        <SEQ_NUM> 3 </SEQ_NUM>
        <CMDFLAGS>
            <CMD> startFlags </CMD>
            <MODE> Synchronous </MODE>
        </CMDFLAGS>
        <EVENTFLAGS>
            <EVENT> onError </EVENT>
            <ACTION>
                <TO_SEQ> 4 </TO_SEQ>
                <DO_CMD> start </DO_CMD>
            </ACTION>
        </EVENTFLAGS>
    <SEQUENCE>
    <SEQUENCE>
        <TYPE> Point-In-Time </TYPE>
        <SEQ_NUM> 4 </SEQ_NUM>
        <CMDFLAGS>
            <CMD> startFlags </CMD>
            <MODE> Copy </MODE>
        </CMDFLAGS>
        <EVENTFLAGS>
            <EVENT> onComplete </EVENT>
            <ACTION>
                <TO_SEQ> 1 </TO_SEQ>
                <DO_CMD> start </DO_CMD>
            </ACTION>
        </EVENTFLAGS>
        <EVENTFLAGS>
            <EVENT> onError </EVENT>
            <ACTION>
                <NOTIFY> Bill </NOTIFY>
            </ACTION>
        </EVENTFLAGS>
    <SEQUENCE>
</SESSION>
```

Figure 6:
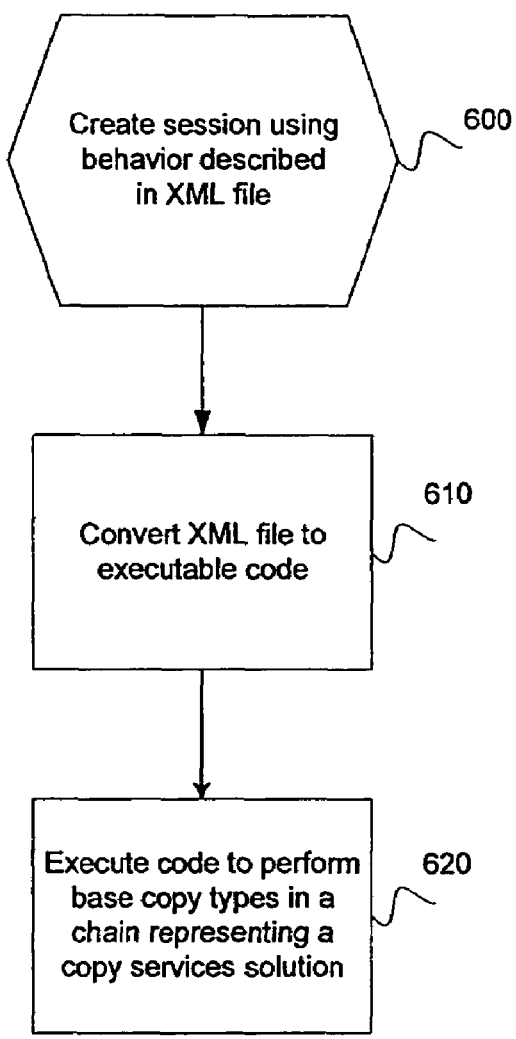
FIG. 6 illustrates logic implemented in a copy services solution (CSS) system for processing an XML file describing a copy services solution in accordance with certain implementations of the invention.

FIG. 6 illustrates logic implemented in the copy services solution (CSS) system 212 for processing an XML file describing a copy services solution in accordance with certain implementations of the invention. Control begins at block 600 with creation of the session using the behavior described in the XML file.

In certain implementations of the invention, the XML describes a copy services solution textually, but the XML file is not directly executable. Therefore, in block 610, the copy services solution system 212 converts the XML file to executable code. An XML file may be converted to any type of executable code using any programming language. In certain implementations of the invention, an XML file is deserialized to JAVA® classes that axe plugged into JAVA® code to build a dynamic session. For example, with reference to the sample pseudocode (1), a session class represents the session, and a sequence class represents a sequence. A session object instantiated from the session class includes a hash table. The hash table includes one entry for each sequence. The hash key stored in the hash table for a sequence is used to access a sequence object (instantiated from the sequence class) for that sequence. A sequence object includes data, such as characteristics of a base copy type, end methods that describe actions to be performed for particular events. Also, an application program reading in the XML file determines the particular base copy services solution (e.g., PPRC versus SRDF™ for a continuous base copy type) to be implemented for the hardware on which the application program is executing. The application program calls the appropriate hardware interface and inputs the correct parameters/properties for the base copy services solution.

Once executable code is generated from the XML file, in block 610, the copy services solution system 212 executes the code to perform base copy types in a chain representing a copy services solution.

In implementations of the invention in which XML files are converted to JAVA® classes, the JAVA® classes may be serialized into XML. Therefore, sequences and their associated characteristics, events, and actions may be converted from JAVA® classes to XML and then stored or transmitted (e.g., over a network) as XML.

Implementations of the invention are dynamic and allow changing a base copy type, its characteristics, or events and actions in an XML file. In particular, implementations of the invention enable a user to modify the XML file quickly, thus modifying the copy services solution quickly. Also, events and/or actions for events may be quickly modified in the XML file.

In certain implementations, some classes may be predefined (e.g., hardcoded) to perform the actions of a particular base copy type. For example, there may be a class to represent a CPPC chain, etc. Due to the large number of possible combinations of base copy types to form chains, only some possible combinations may be represented with a predefined class. Then, new classes maybe written to cover new copy services solutions (e.g., as they are desired or become popular). Thus, in certain implementations of the invention, a user may create an XML file that describes a chain of sequences using customized classes created by the user or may use predefined classes provided by implementations of the invention that may be converted to an XML file to build a chain of sequences or may create a chain of sequences using both predefined classes and customized classes.

By enabling users to create copy services solutions, implementations of the invention free users from being tied down to conventional packaged solutions. In certain implementations of the invention, XML files for some copy services solutions are provided, and the user is able to modify these provided copy services solutions add additional new copy services solutions. In certain implementations of the invention, new copy services solutions may be available on-line for downloading from a web site to a user's computer. In such implementations of the invention, there is no downtime for the user; instead, the newly downloaded copy services solution is stored as XML on a system to be processed by a computer program (e.g., a user interface provided by alternative implementations of the invention to enable downloading and processing of new copy services solutions) or stored on a server that the computer program communicates with to obtain new copy services solutions. These solutions allow a user's environment to be better configured to the user's needs. Thus, since customers have different needs, implementations of the invention accommodate the differences.

Implementations of the invention provide a protocol of using XML to represent data. Certain implementations of the invention use XML because XML is used as a standard for passing/storing information in open environments. In alternative implementations, a protocol other than XML may be used. XML allows data to be represented in a structured manner, which is how the structured copy services solutions created by a user are stored.

In yet further implementations, a user could write a computer program using a different protocol (i.e., a protocol other than XML) and create an interface that calls implementations of the invention with an XML file that is built to represent a copy services solution that the user described using the different protocol.

When storing copy services solutions created by a user, XML creates a small footprint in storage (e.g., on a disk). Alternative solutions that create a computer program for many possible copy services solutions may be very large and non-dynamic. With implementations of the invention that provide a dynamic solution using an XML file to define sequences, the XML file is smaller than a computer program for a non-dynamic solution, uses less memory to run, and enables users to create any desired copy services solution. Additionally, implementations of the invention are not hardware specific, and any hardware type may be used with implementations of the invention, and heterogenous environments (i.e., environments including hardware from different vendors and/or of different types) may be formed.

Implementations of the invention make management of relationships autonomic (i.e., provides automation and removes human intervention). The XML defines what the code should do given certain events, removing the need for human intervention and management. The XML is also each to modify and additional sequences may be added as more complex autonomic capabilities are implemented.

Implementations of the invention provide autonomic capabilities to a set of volumes under a certain copy type (e.g., a session). In conclusion, certain implementations of the invention define base copy types using XML documents. The XML files describe a copy services solution in whole so that the copy services solution system 212 reads in an XML file and knows how to build a copy services solution and knows what to do for given events that occur during the execution of the copy services solution. Using these XML files, users (e.g., copy services management developers) are able to develop new copy services solutions that include autonomic management. Moreover, implementations of the invention form a chain of base copy types, without regard for the type of hardware being used.

FlashCopy is a trademark or registered trademark of International Business Machines Corporation in the United States and/or other countries. Symmetrix, SRDF, and TimeFinder are trademarks or registered trademarks of EMC Corporation in the United States and/or other countries. JAVA is a trademark or registered trademark of Sun Microsystems in the United States and/or other countries.

ADDITIONAL IMPLEMENTATION DETAILS

The described techniques for autonomic copy services solutions may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIG. 6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIG. 6 was described as being implemented in software. The logic may be implemented in hardware, in programmable and non-programmable gate array logic or in some combination of hardware, software, or gate array logic.

Figure 7:
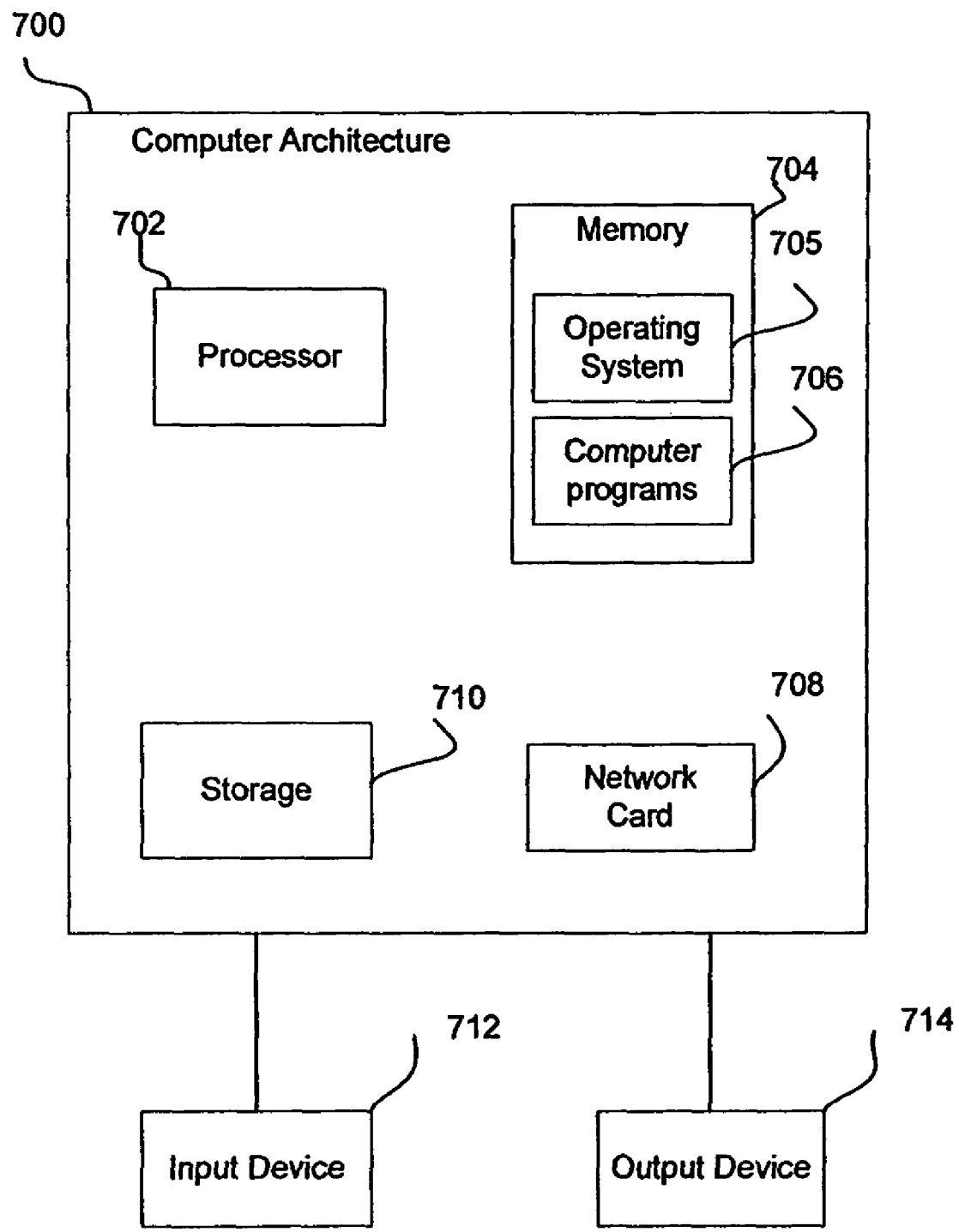
FIG. 7 illustrates an architecture of a computer system (e.g., 200 and/or 220) that may be used in accordance with certain implementations of the invention.

FIG. 7 illustrates an architecture of a computer system (e.g., 200 and/or 220) that may be used in accordance with certain implementations of the invention. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information transmitted from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for creating a copy services solution, comprising:
   receiving a document describing the copy services solution, wherein the copy services solution describes a chain of multiple base copy types, wherein the document describes at least one base copy type with an event and an action to be performed for that event, wherein the document is not directly executable, wherein the base copy types include a continuous base copy type that refers to a base copy services solution in which copying is performed from a first storage to a second storage when data is written on the first storage and a point-in-time base copy type that refers to a base copy services solution in which a copy of data is made at a given point in time, and wherein the copy services solution is capable of being changed by modifying the document;
   converting the document to executable code by identifying a base copy services solution to implement for each base copy type described in the document based on hardware on which an application program that reads the document is executing; and
   executing the code to perform the base copy services solutions described with the chain of multiple base copy types in the document.

2. The method of claim 1, wherein the document comprises an Extensible Markup Language document.

3. The method of claim 1, wherein the document describes a session comprising one or more sequences and wherein each sequence represents a base copy type.

4. The method of claim 3, wherein at least one sequence includes characteristics for the base copy type represented by that sequence.

5. The method of claim 3, wherein at least one sequence includes an event and one or more actions to be performed for that event.

6. The method of claim 2, wherein converting the document to executable code further comprises:
   deserializing the Extensible Markup Language document to form one or more classes, wherein each class includes data describing zero or more characteristics of a base copy type and including zero or more methods representing actions to be performed for particular events.

7. An article of manufacture for creating a copy services solution, wherein the article of manufacture causes operations, the operations comprising:
   receiving a document describing the copy services solution, wherein the copy services solution describes a chain of multiple base copy types, wherein the document describes at least one base copy type with an event and an action to be performed for that event, wherein the document is not directly executable, wherein the base copy types include a continuous base copy type that refers to a base copy services solution in which copying is performed from a first storage to a second storage when data is written on the first storage and a point-in-time base copy type that refers to a base copy services solution in which a copy of data is made at a given point in time, and wherein the copy services solution is cap able of being changed by modifying the document;
   converting the document to executable code by identifying a base copy services solution to implement for each base copy type described in the document based on hardware on which an application program that reads the document is executing; and
   executing the code to perform the base copy services solutions described with the chain of multiple base copy types in the document.

8. The article of manufacture of claim 7, wherein the document comprises an Extensible Markup Language document.

9. The article of manufacture of claim 7, wherein the document describes a session comprising one or more sequences and wherein each sequence represents a base copy type.

10. The article of manufacture of claim 9, wherein at least one sequence includes characteristics for the base copy type represented by that sequence.

11. The article of manufacture of claim 9, wherein at least one sequence includes an event and one or more actions to be performed for that event.

12. The article of manufacture of claim 8, wherein operations for converting the document to executable code further comprise:
   deserializing the Extensible Markup Language document to form one or more classes, wherein each class includes data describing zero or more characteristics of a base copy type and including zero or more methods representing actions to be performed for particular events.

13. A system for creating a copy services solution, comprising:
   means for receiving a document describing the copy services solution, wherein the copy services solution describes a chain of multiple base copy types, wherein the document describes at least one base copy type with an event and an action to be performed for that event, wherein the document is not directly executable, wherein the base copy types include a continuous base copy type that refers to a base copy services solution in which copying is performed from a first storage to a second storage when data is written on the first storage and a point-in-time base copy type that refers to a base copy services solution in which a copy of data is made at a given point in time, and wherein the copy services solution is capable of being changed by modifying the document;

means for converting the document to executable code by identifying a base copy services solution to implement for each base copy type described in the document based on hardware on which an application program that reads the document is executing; and means for executing the code to perform the base copy services solutions described with the chain of multiple base copy types in the document.

14. The system of claim 13, wherein the document comprises an Extensible Markup Language document.

15. The system of claim 13, wherein the document describes a session comprising one or more sequences and wherein each sequence represents a base copy type.

16. The system of claim 15, wherein at least one sequence includes characteristics for the base copy type represented by that sequence.

17. The system of claim 15, wherein at least one sequence includes an event and one or more actions to be performed for that event.

* * * * *